(12) United States Patent
Ciriniconi et al.

(10) Patent No.: US 11,298,756 B1
(45) Date of Patent: Apr. 12, 2022

(54) SHAFT DEBURRING DEVICE

(71) Applicants: Christopher C. Ciriniconi, Corning, CA (US); Robert Monroe, Woodland, CA (US)

(72) Inventors: Christopher C. Ciriniconi, Corning, CA (US); Robert Monroe, Woodland, CA (US)

( * ) Notice: Subject to any disclaimer, the term of this patent is extended or adjusted under 35 U.S.C. 154(b) by 151 days.

(21) Appl. No.: 16/420,358

(22) Filed: May 23, 2019

(51) Int. Cl.
*B23B 51/10* (2006.01)
*B23B 5/16* (2006.01)
*B23B 51/02* (2006.01)

(52) U.S. Cl.
CPC ............ *B23B 51/101* (2013.01); *B23B 5/168* (2013.01); *B23B 51/02* (2013.01); *B23B 2220/08* (2013.01); *B23B 2251/50* (2013.01); *B23B 2270/027* (2013.01); *B23B 2270/24* (2013.01)

(58) Field of Classification Search
CPC ......... B23B 5/16; B23B 51/101; B23B 5/168; B23B 51/02; B23B 2270/24; B23B 2220/08; B23B 2270/027; B23B 5/165; B23B 51/103; B23B 2215/72; B08B 9/021; B08B 9/023; B24B 9/007
See application file for complete search history.

(56) References Cited

U.S. PATENT DOCUMENTS

| 3,188,674 | A | * | 6/1965 | Hobbs | B08B 9/021 15/179 |
| 3,442,162 | A | | 5/1969 | Cogsdill et al. | |
| 3,720,477 | A | | 3/1973 | Rusin et al. | |
| 3,973,861 | A | | 8/1976 | Sussmuth et al. | |
| 4,619,345 | A | * | 10/1986 | Rands | A46D 1/00 118/76 |
| 7,361,079 | B2 | * | 4/2008 | Pryce | B08B 9/021 15/104.04 |
| 7,507,057 | B2 | | 3/2009 | Beier et al. | |
| 8,434,185 | B1 | * | 5/2013 | Beaver, Sr. | A46D 1/0284 15/104.05 |
| 8,696,266 | B2 | | 4/2014 | Beier et al. | |
| 9,216,439 | B2 | * | 12/2015 | Le Blanc | B24D 13/10 |
| 9,974,382 | B2 | * | 5/2018 | Lin | A46B 13/001 |
| 2004/0031112 | A1 | * | 2/2004 | Saurer | A46B 13/001 15/88 |

(Continued)

FOREIGN PATENT DOCUMENTS

| DE | 10033378 A1 | * | 1/2002 | ............... B44D 3/16 |
| EP | 2058067 B1 | | 7/2014 | |

OTHER PUBLICATIONS

Device with a drive and a deburring tool as well as deburring tool. Patent Translation [online]. Google Patents [retrieved on Aug. 16, 2017], Retrieved from the Internet: <URL:https://patents.google.com/patent/EP2058067B1/en?pq=exterior+deburring+tool>.

(Continued)

*Primary Examiner* — Eric A. Gates
*Assistant Examiner* — Paul M Janeski
(74) *Attorney, Agent, or Firm* — Cramer Patent & Design, PLLC; Aaron R. Cramer

(57) ABSTRACT

A shaft deburring device includes a tubular metallic shaft having a drill mount at a first end and a deburring collar at a second end. The deburring collar has a plurality of radially disposed grinding balls secured about an interior surface of the collar. An exterior surface of the deburring collar has a plurality of radially disposed bristles.

15 Claims, 5 Drawing Sheets

(56) References Cited

U.S. PATENT DOCUMENTS

| | | | |
|---|---|---|---|
| 2009/0235470 A1* | 9/2009 | Moisides | B08B 9/021 15/21.1 |
| 2010/0122423 A1* | 5/2010 | Lozar | B08B 9/023 15/104.04 |
| 2010/0263145 A1* | 10/2010 | Chen | A46B 13/001 15/160 |
| 2015/0335143 A1* | 11/2015 | Edmond | A46B 13/02 15/88 |

OTHER PUBLICATIONS

Rems 113825 Reg Deburring Tool (8-35MM). Product Listing [online]. Pipe Tools Direct [retrieved on Aug. 16, 2017], Retrieved from the Internet: <URL:https://www.pipetoolsdirect.co.uk/rems-113825-reg-deburring-tool-8-35mm.html>.

* cited by examiner

SHAFT DEBURRING DEVICE

FIELD OF THE INVENTION

The presently disclosed subject matter is directed to a shaft deburring device.

BACKGROUND OF THE INVENTION

Metal shafts are utilized in a wide range of industries that cover the industrial, commercial, institutional and even residential markets. No matter how or where metal shafts are used, it is typical requirement that they be smooth and free from burrs, scratches, paint, rust or other foreign unwanted material.

The typical process to remove such material is to use chemicals or abrasive methods such as sandpaper. While such methods work, they are either messy, dangerous, time consuming, or leave the surface of the shaft uneven with flat spots. Accordingly, there exists a need for a means by which metal shafts can be easily cleaned in a safe manner without the disadvantages of present methods. The development of the shaft deburring device fulfills this need.

SUMMARY OF THE INVENTION

The principles of the present invention provide for a shaft deburring tool comprising a main tool head having a cavity. The cavity holds a plurality of abrasive ball hones with each of the abrasive ball hones providing a flexible stem which is placed in a radially symmetrical pattern with respect to a center point of the main tool head. Each of the flexible stem is anchored in place. The tool also provides a hollow guide tube which is attached to the main tool head in a radial manner that is aligned axially with the cavity. An overall length of the hollow guide tube governing the overall length of a worked shaft is machined using the shaft deburring tool. The shaft deburring tool may be engaged with the worked shaft by placing the cavity over the worked shaft. The tool also provides an end cap which is disposed on a distal end of the guide tube opposite of the main tool head and a face cap which is provided to aid in the centering and control of the worked shaft when inserted, the face cap attached to the main tool head by a plurality of fasteners. The tool also provides an attaching shaft which is on an opposite side of the end cap to form the hollow guide tube. The attaching shaft allows for connection of a powered rotatory tool to spin the shaft deburring tool.

The shaft deburring tool may be used to finish the worked shaft with varying outer diameters while ensuring that the shaft deburring tool remains centered in the cavity to receive a symmetrical finish. The main tool head may be annulus-shaped while the anchoring means may comprise an epoxy. The powered rotational tool may be moved back and forth along a linear movement path while the powered rotational tool moves the shaft deburring tool along a rotational movement path to produce a finish on an exterior of the worked shaft. A lubrication fluid or cutting oil may be used to produce the finish.

The hollow guide tube may be connected to the main tool head by an attachment system which may be selected from the group consisting of a threaded connection, a plurality of set screws, one or more welds, or a twist lock. The hollow guide tube may be ten inches. The worked shaft may be inside the cavity and may penetrate the hollow guide tube. The worked shaft may be a cylindrical shaft that requires exterior finishing selected from the group consisting of corrosion removal, contaminant removal, or removal of nicks, gouges, or scratches and may be constrained by an internal diameter of the face cap and provides for alignment of the worked shaft within a finishing action provided by the abrasive ball hones.

The tool may also be used on the worked shaft with a diameter in the range of fractions of one inch up to several inches while the fasteners may be a plurality of machine screws. The fasteners may be removed to allow for replacement of the face cap with another the face cap with a smaller internal diameter or to allow for replacement of the face cap with another the face cap with a larger internal diameter.

The powered rotatory tool may be selected from the group consisting of a standard electric drill, a portable drill, a drill press, a metal working lathe, or a milling machine. The attaching shaft may be axially centered with respect to the end cap while the main tool head may facilitate operation by the powered rotatory tool for spinning the shaft deburring tool.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
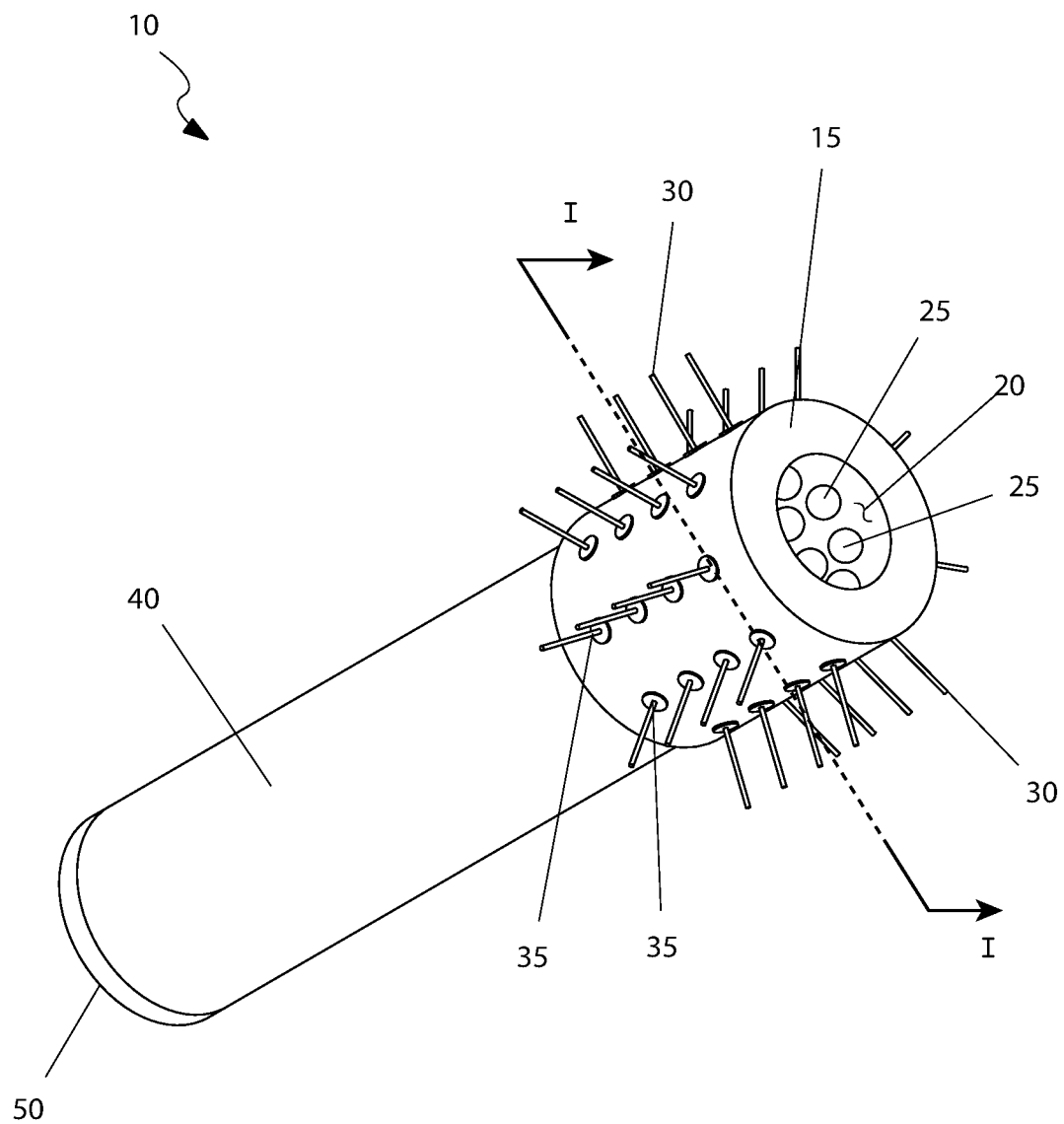
FIG. 1 is a perspective view of the shaft deburring tool 10, according to a preferred embodiment of the present invention.

DESCRIPTIVE KEY 10 shaft deburring tool
15 main tool head
20 cavity
25 abrasive ball hone
30 flexible stem
35 adhesive
40 guide tube
45 worked shaft
50 end cap
55 face cap
60 attaching shaft means
65 fasteners
70 internal diameter "id"
75 attachment system
80 user 85 powered rotational tool
90 linear movement path "l"
95 rotational movement path "r"

DESCRIPTION OF THE PREFERRED EMBODIMENTS

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) configuration shall be shown and described for purposes of clarity and disclosure and not by way of limitation of scope. All the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the shaft deburring tool 10, according to a preferred embodiment of the present invention is disclosed. The shaft deburring tool 10 (herein also described as the "tool") 10, includes a main tool head 15 in the overall shape of an annulus. The main tool head 15 provides for a cavity 20 which holds a plurality of abrasive ball hones 25

Each abrasive ball hone 25 is provided with flexible stem 30 which is placed in a radially symmetrical pattern with respect to the center point of the main tool head 15. Each flexible stem 30 is anchored in place with adhesive 35 such as epoxy. A guide tube 40, hollow in design, is attached to the main tool head 15 in a radial manner such that it is aligned axially with the cavity 20. The overall length of the guide tube 40 will govern the overall length of the worked shaft 45 (not shown in this FIGURE) that can be machined using the tool 10. A typical length would be approximately ten inches (10 in.) as depicted in FIG. 1.

The worked shaft 45 can be any cylindrical shaft, used in any variety of applications, that requires exterior finishing including but not limited to corrosion removal, contaminant removal, removal of nicks, gouges, or scratches, and similar machining. An end cap 50 is visible on the distal end of the guide tube 40 opposite of the main tool head 15 as shown. Further description of the end cap 50 will be provided herein below. It is noted that all dimensions of the tool 10 would vary per specific applications. As such, the use of any specific dimension, diameter, radius, quantity or arrangement of abrasive ball hones 25, or the like is not intended to limit the scope of the present invention. However, it is envisioned the use of the tool 10 would typically be used on worked shaft 45 with diameters ranging from fractions of one inch (1 in.) up to several inches.

Figure 2:
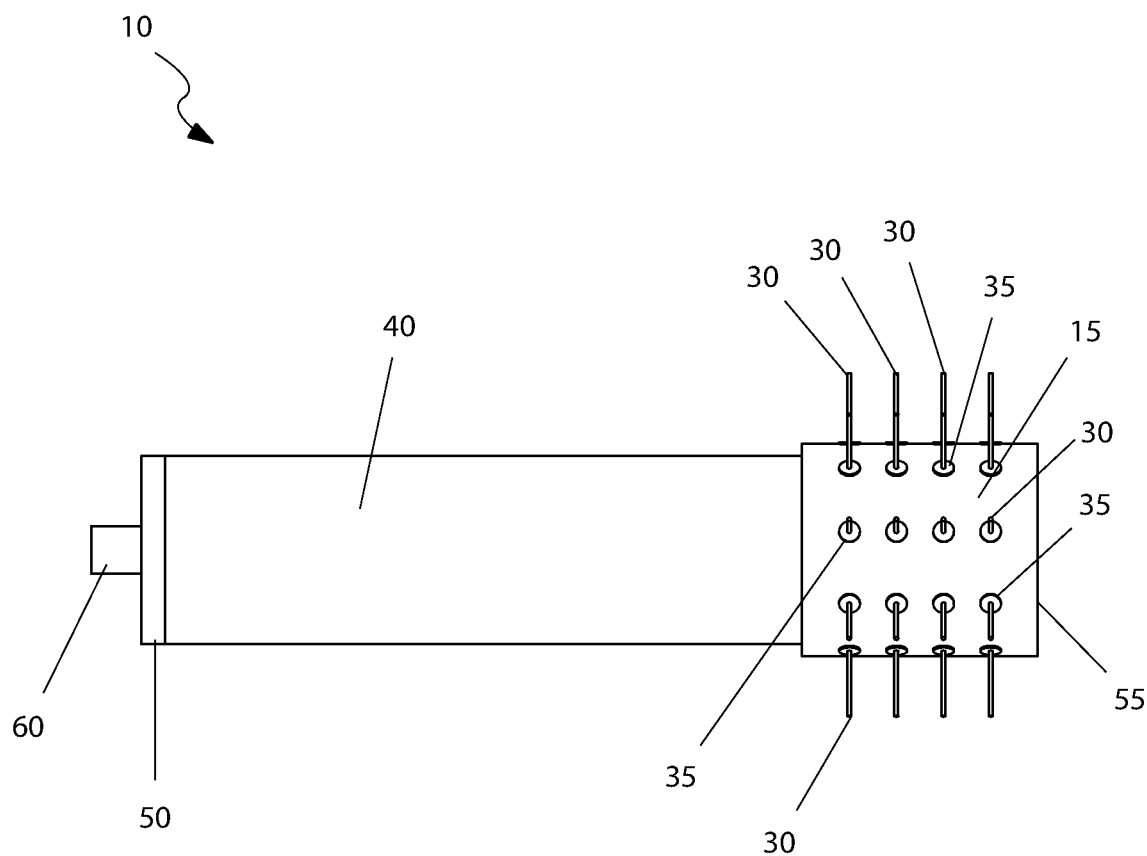
FIG. 2 is a side elevation view of the shaft deburring tool 10, according to the preferred embodiment of the present invention.

Referring next to FIG. 2, a side elevation view of the tool 10, according to the preferred embodiment of the present invention is depicted. The multitude of flexible stems 30 are secured into the main tool head 15 by the adhesive 35 as aforementioned described. A face cap 55 is provided to aid in the centering and control of the worked shaft 45 (not shown in this FIGURE) when inserted. Further description of the face cap 55 will be provided below. An attaching shaft means 60 is provided on the opposite side of the end cap 50 form the guide tube 40. The attaching shaft means 60 allows for the connection of a standard electric drill or other rotatory powered device for the purposes of spinning the tool 10.

Figure 3:
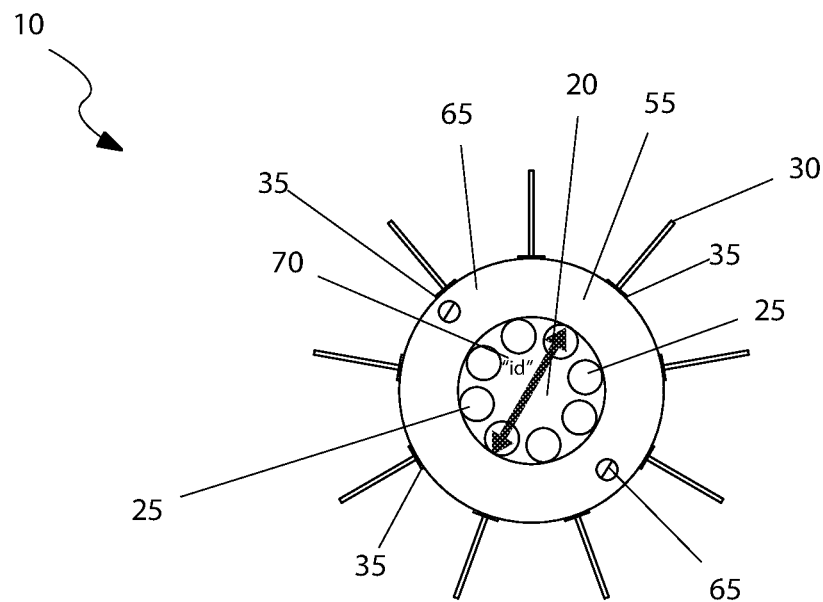
FIG. 3 is a front elevation view of the shaft deburring tool 10, according to the preferred embodiment of the present invention.

Referring now to FIG. 3, a front elevation view of the tool 10, according to the preferred embodiment of the present invention is shown. This figure provides clear description of the cavity 20 and the symmetrical circular nature of same. The face cap 55 is attached to the main tool head 15 (not visible in this FIGURE due to illustrative limitations) by use of fasteners 65 such as machine screws. Fasteners 65 may be easily removed to allow for replacement of the face cap 55 with another with a smaller or larger internal diameter "id" 70. Thus, the tool 10 can be used to finish worked shaft 45 (not shown in this FIGURE) with varying outer diameter while ensuring that they remain centered in the cavity 20 thus receiving a symmetrical finish.

Figure 4:
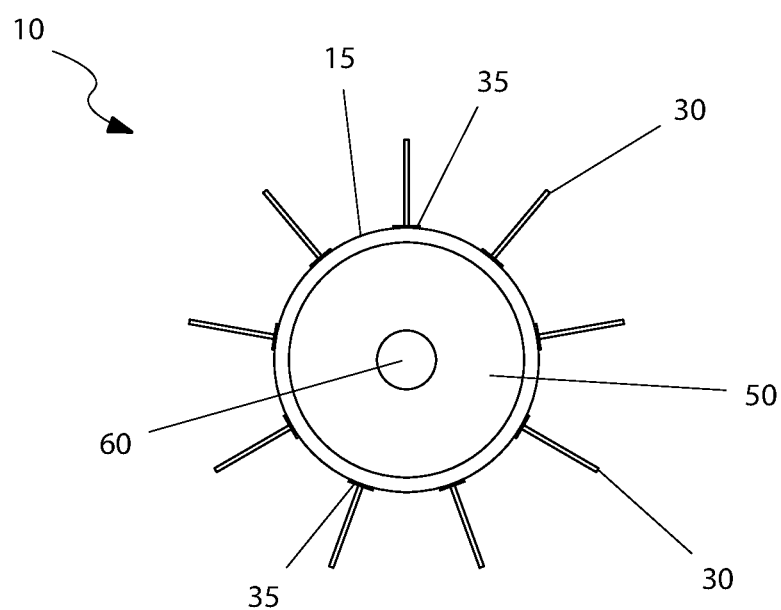
FIG. 4 is a rear elevation view of the shaft deburring tool 10, according to the preferred embodiment of the present invention.

Referring next to FIG. 4, a rear elevation view of the tool 10, according to the preferred embodiment of the present invention is disclosed. It is noted that the attaching shaft means 60 is axially centered with respect to the end cap 50 and the main tool head 15 to facilitate operation by a standard electric drill or other rotatory powered device for the purposes of spinning the tool 10. It is also noted that the flexible stems 30 are shown in an elongated state. They may or may not be removed back to the point of contact with the adhesive 35 to facilitate safe operation and/or ease of use.

Figure 5:
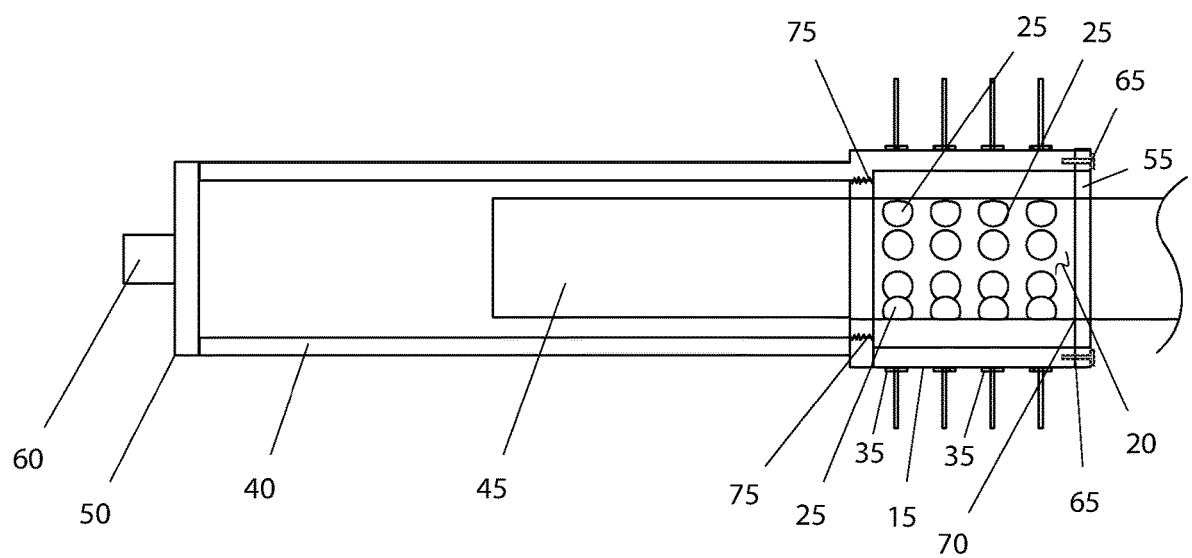
FIG. 5 is a sectional view of the shaft deburring tool 10, as seen along a line I-I, as shown in FIG. 1, according to the preferred embodiment of the present invention; and, FIG. 6 is an environmental view of a shaft deburring tool 10 as it is prepared to engage a worked shaft 45 as guided by a user 80, according to a preferred embodiment of the present invention.

Referring now to FIG. 5, a sectional view of the tool 10, as seen along a line I-I, as shown in FIG. 1, according to the preferred embodiment of the present invention is depicted. The worked shaft 45 is shown in side of the cavity 20 and penetrating the hollow nature of the guide tube 40. The guide tube 40 is connected to the main tool head 15 by means of an attachment system 75 here shown as a threaded connection, although other attachment system 75 such as set screws, welding, twist lock, or the like may be used with equal effectiveness. The fasteners 65 are shown connecting the face cap 55 to the main tool head 15. It is envisioned that the end cap 50 would be attached to the guide tube 40 and the attaching shaft means 60 would be attached to the end cap 50 by weldment. It is noted that the worked shaft 45 is constrained by the internal diameter "id" 70 of the face cap 55 and provides for alignment of the worked shaft 45 within the finishing action provide by the abrasive ball hones 25.

Figure 6:
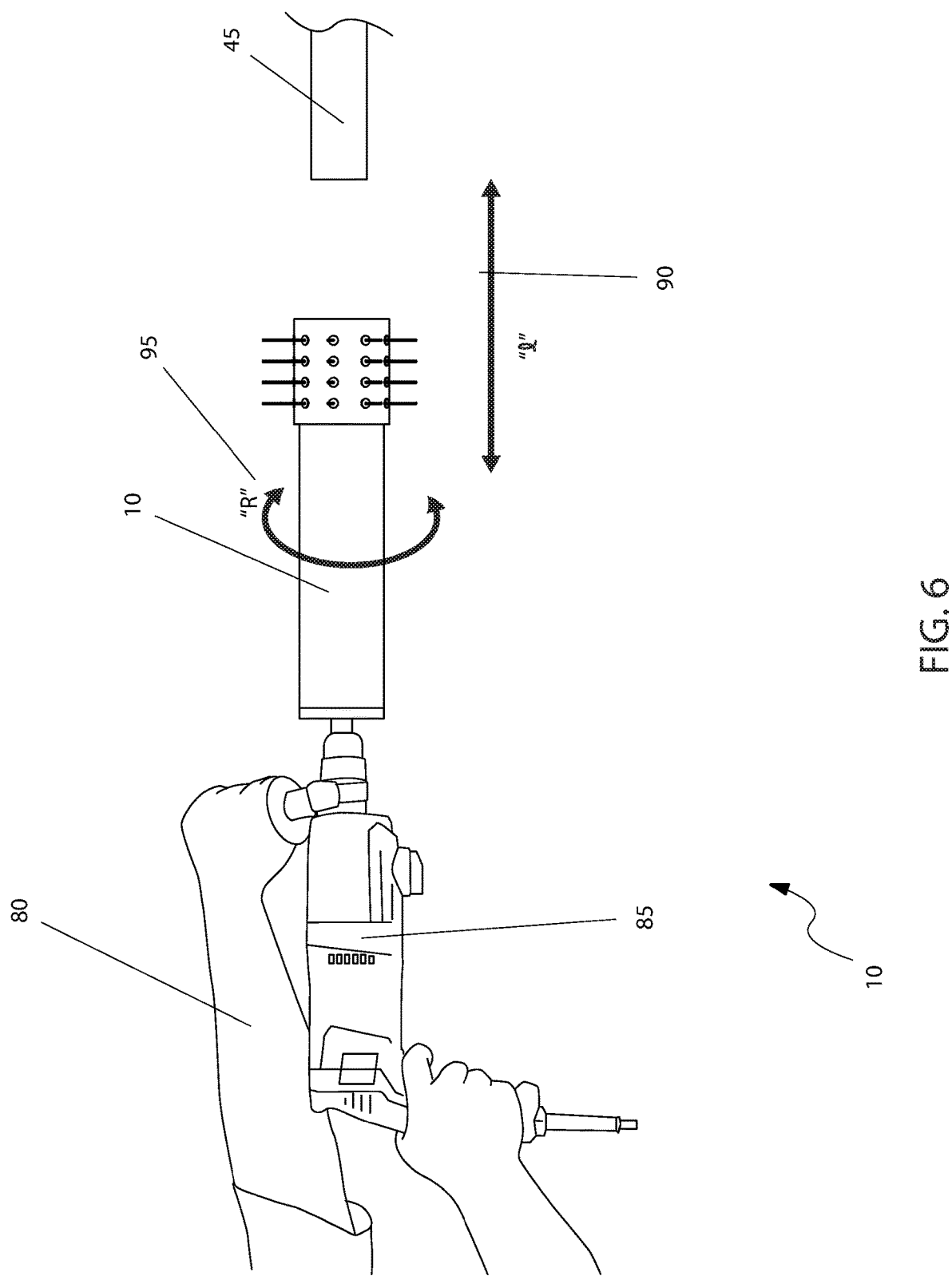

Referring finally to FIG. 6, an environmental view of the tool 10 as it is prepared to engage a worked shaft 45 as guided by a user 80, according to a preferred embodiment of the present invention is shown. The user 80 is holding a powered rotational tool 85, herein depicted as a portable electric drill, upon which the tool 10 is mounted. However, as previously noted any type of powered rotational tool 85 including, but not limited to: a portable drill, a drill press, a metal working lathe, or a milling machine may be used with equal effectiveness. As such, the use of the tool 10 with any style of powered rotational tool 85 is not intended to be a limiting factor of the present invention.

The tool 10 is engaged with the worked shaft 45 by placing the cavity 20 (as shown in FIG. 1) over the worked shaft 45. The user 80 would move the powered rotational tool 85 back and forth along a linear movement path "l" 90 while the powered rotational tool 85 moves the tool 10 along a rotational movement path "r" 95 to produce a finish on the exterior of the worked shaft 45. It is noted that the rotational movement path "r" 95 may be either in a clockwise or counter-clockwise rotation. Lubrication fluid or cutting oil may be used during said finishing operation. The finishing operation cleans and polishes the worked shaft 45 of minor burrs, rust, and coatings.

2. Operation of the Preferred Embodiment

The preferred embodiment of the present invention can be utilized by the common user in a simple and effortless manner with little or no training. It is envisioned that the tool 10 would be constructed in general accordance with FIG. 1 through FIG. 6. The user would procure the tool 10 through conventional tool procurement channels while paying attention to various physical parameters of the tool 10 such as diameter of the cavity 20, length of the guide tube 40, amount, configuration, and grit of the abrasive ball hones 25, and similar parameters.

After procurement and prior to utilization, the tool 10 would be prepared in the following manner: the tool 10 would be placed in a powered rotational tool 85; and the worked shaft 45 would be secured in a preferable horizontal position.

During utilization of the tool 10, the following procedure would be initiated: the cavity 20 of the tool 10 would be engaged over the worked shaft 45 through the face cap 55; the powered rotational tool 85 energized; lubrication may be sprayed on the worked shaft 45, and the tool 10 moved back and forth along the linear movement path "l" 90.

After use of the tool 10, the powered rotational tool 85 is de-energized and the tool 10 is removed from over the worked shaft 45. This operation may be repeated on other worked shaft 45 in a repeating manner.

The operation provides multiple benefits over conventional shaft finishing methods including, but not limited to simplicity of use, minimal energy expended by the user 80, reduced use of emery cloth, ease of use in tight spaces, and the like.

The foregoing descriptions of specific embodiments of the present invention have been presented for purposes of illustration and description. They are not intended to be exhaustive or to limit the invention to the precise forms disclosed, and obviously many modifications and variations are possible considering the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A shaft deburring tool, comprising:
a main tool head having a cylindrical shape further having an exterior main tool head surface, an interior main tool head cavity and an interior main tool head cavity surface, said main tool head cavity directly holds a plurality of abrasive ball hones, each of said abrasive ball hones are provided with a flexible stem, each said abrasive ball hone is placed in a radially symmetrical pattern with respect to a center point of said main tool head along said main tool head cavity surface, each said flexible stem is anchored in place and extends outwardly from the interior main tool head cavity and through the interior main tool head cavity surface and through the exterior main tool head surface;
a hollow guide tube attached to said main tool head in a radial manner that is aligned axially with said interior main tool head cavity, an overall length of said hollow guide tube governing said overall length of a worked shaft is machined using said shaft deburring tool, said shaft deburring tool is engaged with said worked shaft by placing said interior main tool head cavity over said worked shaft;
an end cap disposed on a distal end of said guide tube opposite of said main tool head;
a face cap provided to aid in centering and control of said worked shaft when inserted, said face cap attached to said main tool head by a plurality of fasteners; and
an attaching shaft disposed on an opposite side of said end cap away from said hollow guide tube, said attaching shaft allows for connection of a powered rotatory tool to spin said shaft deburring tool;
wherein said main tool head is annulus-shaped;
wherein said hollow guide tube is connected to said main tool head by an attachment system;
wherein said attaching shaft is axially centered with respect to said end cap;
wherein said worked shaft is constrained by an internal diameter of said face cap and provides for alignment of said worked shaft within a finishing action provided by said abrasive ball hones; and
wherein the abrasive ball hones in the shaft deburring tool are disposed on a proximal end of the stems within the interior main tool head cavity.

2. The shaft deburring tool according to claim 1, wherein said shaft deburring tool is used to finish said worked shaft with varying outer diameters while ensuring that said shaft deburring tool remains in said interior main tool head cavity.

3. The shaft deburring tool according to claim 1, wherein an anchor means is an epoxy.

4. The shaft deburring tool according to claim 1, wherein said powered rotational tool is moved back and forth along a linear movement path while said powered rotational tool moves said shaft deburring tool along a rotational movement path to produce a finish on an exterior of said worked shaft.

5. The shaft deburring tool according to claim 4, wherein lubrication fluid is used to produce said finish.

6. The shaft deburring tool according to claim 4, wherein cutting oil is used to produce said finish.

7. The shaft deburring tool according to claim 1, wherein said attachment system is selected from the group consisting of a threaded connection, a plurality of set screws, one or more welds, or a twist lock.

8. The shaft deburring tool according to claim 1, wherein said hollow guide tube is ten inches.

9. The shaft deburring tool according to claim 1, wherein said worked shaft is inside said interior main tool head cavity and penetrates said hollow guide tube.

10. The shaft deburring tool according to claim 1, wherein said worked shaft is a cylindrical shaft that requires exterior finishing selected from the group consisting of corrosion removal, contaminant removal, or removal of nicks, gouges, or scratches.

11. The shaft deburring tool according to claim 1, wherein said shaft deburring tool is used on said worked shaft with a diameter in the range of fractions of one inch up to several inches.

12. The shaft deburring tool according to claim 1, wherein said fasteners are a plurality of machine screws.

13. The shaft deburring tool according to claim 1, wherein said fasteners are removed to allow for replacement of said face cap with another said face cap with a smaller internal diameter.

14. The shaft deburring tool according to claim 1, wherein said fasteners are removed to allow for replacement of said face cap with another said face cap with a larger internal diameter.

15. The shaft deburring tool according to claim 1, wherein said powered rotatory tool is selected from the group consisting of a standard electric drill, a portable drill, a drill press, a metal working lathe, or a milling machine.

* * * * *